(12) United States Patent
Ngai et al.

(10) Patent No.: US 11,043,038 B1
(45) Date of Patent: Jun. 22, 2021

(54) APPARATUS AND METHOD OF THREE-DIMENSIONAL INTERACTION FOR AUGMENTED REALITY REMOTE ASSISTANCE

(71) Applicant: Hong Kong Applied Science and Technology Research Institute Company Limited, Hong Kong (HK)

(72) Inventors: Yat Cheung Ngai, Hong Kong (HK); Yin Yee Chan, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 16/820,644

(22) Filed: Mar. 16, 2020

(51) Int. Cl.
*G06T 19/00* (2011.01)
*G06T 7/70* (2017.01)
*G06T 15/06* (2011.01)
*G06T 15/20* (2011.01)
*G06T 19/20* (2011.01)

(52) U.S. Cl.
CPC ............ *G06T 19/006* (2013.01); *G06T 15/06* (2013.01); *G06T 15/20* (2013.01); *G06T 19/20* (2013.01); *G06T 2219/2016* (2013.01)

(58) Field of Classification Search
None
See application file for complete search history.

(56) References Cited

U.S. PATENT DOCUMENTS 8,072,448 B2 12/2011 Zhu et al.
8,810,599 B1 8/2014 Tseng
8,842,163 B2 9/2014 Datta et al.
9,269,011 B1 2/2016 Sikka et al.
9,418,480 B2 8/2016 Issa et al.
9,558,581 B2 1/2017 Wang et al.
(Continued)

FOREIGN PATENT DOCUMENTS

CN 104102678 A 10/2014
CN 107229706 A 10/2017
(Continued)

OTHER PUBLICATIONS

International Search Report of corresponding PCT Patent Application No. PCT/2020/079868 dated Dec. 16, 2020.

*Primary Examiner* — Diane M Wills
(74) *Attorney, Agent, or Firm* — Idea Intellectual Limited; Margaret A. Burke; Sam T. Yip (57) ABSTRACT

A method of tracking a point of interest (POI) in an electronic three-dimensional (3D) viewing environment, comprising: capturing via an optical sensor and recording motions of an onsite user, wherein each motion comprises an image surrounding and a pose of the onsite user; displaying a snapshot to a remote user, wherein the snapshot is one of the recorded motions; receiving a POI indicator in the snapshot from the second user; estimating a 3D position of the POI in the electronic 3D viewing environment using the POI indicator data, a moving trajectory from each of the recorded motions to the snapshot, and an estimation of distance between the optical sensor to the POI center; and rendering and superimposing the POI indicator in the electronic 3D viewing environment to be displayed to the onsite user using the estimated 3D position of the POI, the moving trajectory, and the recorded motions.

16 Claims, 7 Drawing Sheets

(56) References Cited

U.S. PATENT DOCUMENTS

| | | | |
|---|---|---|---|
| 10,210,662 | B2 | 2/2019 | Holzer et al. |
| 10,373,380 | B2 | 8/2019 | Kutliroff et al. |
| 10,497,179 | B2 | 12/2019 | Ngai et al. |
| 2011/0137561 | A1 | 6/2011 | Kankainen |
| 2012/0195471 | A1 | 8/2012 | Newcombe et al. |
| 2012/0306876 | A1 | 12/2012 | Shotton et al. |
| 2016/0055676 | A1* | 2/2016 | Kasahara ............... G06T 19/006 345/633 |
| 2016/0109940 | A1* | 4/2016 | Lyren .................... H04W 4/023 463/2 |
| 2018/0322702 | A1 | 11/2018 | Djajadiningrat |

FOREIGN PATENT DOCUMENTS

| | | | |
|---|---|---|---|
| CN | 107918954 | A | 4/2018 |
| CN | 110233841 | A | 9/2019 |
| CN | 110443898 | A | 11/2019 |
| EP | 3306572 | A1 | 4/2018 |
| JP | 4691158 | B2 | 6/2011 |
| KR | 101319667 | B1 * | 10/2013 |
| KR | 101319667 | B1 | 10/2013 |
| WO | 2019099979 | A1 | 5/2019 |

* cited by examiner

Input: Snapshot Image with POI

Estimation: POI 3D Data Point

APPARATUS AND METHOD OF THREE-DIMENSIONAL INTERACTION FOR AUGMENTED REALITY REMOTE ASSISTANCE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods and systems for electronic three-dimensional (3D) viewing environment user-interactions and the use of electronic 3D viewing environments for augmented reality remote assistance.

BACKGROUND OF THE INVENTION

Previously, field technicians relied on several computing devices like smartphones and laptops for installation and maintenance of information technology (IT) equipment. This typically consumed significant time and efforts to simultaneously manage and use these number of devices to access information stored remotely, not to mention the added difficulty of having to collaborate with other personnel and subject matter experts located afar. The introduction of the augmented reality (AR) viewing devices (i.e. AR glasses, smartphones and tablet computers configured for AR applications) in their fieldwork, real-time intelligence, troubleshooting log, graphics and encrypted data from back-end systems can be streamed and made accessible onsite to the field technicians anytime and anywhere, improving operation speed and quality significantly.

In the case of complex troubleshooting operations, a backend engineer located in a remote location can view the streamed real-time images transmitted from the AR viewing device being used by the onsite field technician to an AR operation console. Having the streamed images displayed (in 2D) in the AR operation console, the backend engineer can define a point of interest (POI) in the images and cause the POI be tracked with its indicator superimposed in the electronic 3D viewing environment being viewed by the field technician through her AR viewing device. This instant electronic 3D interaction capability significantly improves operational speed and quality.

However, the current approaches in tracking a POI and projecting its indicator in electronic 3D viewing environment through geometry calibration, feature extraction, and 3D mapping faces challenges of high cost, POI indicator positioning accuracy and reliability.

SUMMARY OF THE INVENTION

In addressing the aforesaid challenges in the current state of the art, the present invention provides an apparatus and method of allowing POIs to be defined and tracked in electronic 3D viewing environments, so be useful in various applications including augmented reality remote assistance. One objective of the present invention is to provide such apparatus and method that can track the user-defined POIs in real-time with high accuracy and reliability. It is also an objective of the present invention to provide such apparatus and method that do not require expensive equipment such as high-end depth sensor or intensive data computation algorithms.

In accordance with one embodiment of the present invention, provided a method of tracking a POI in an electronic 3D viewing environment, comprising: capturing and recording a plurality of motions (each motion having a surrounding image and a pose) of an onsite user; displaying a snapshot, wherein the snapshot is one of the recorded motions, to allow a POI indicator to be defined on the snapshot; determining a moving trajectory from each recorded motion to the snapshot; estimating a 3D position of the POI in the electronic 3D viewing environment, using the POI indicator data, the recorded motions, the moving trajectory from each recorded motion to the snapshot, and an estimation of distance between the optical sensor to the POI center (or any one reference point within the POI); and rendering and superimposing the POI indicator in the electronic 3D viewing environment to be displayed to the first user using the estimated 3D position of the POI, the moving trajectory, and recorded motions.

In one embodiment, the estimation of a 3D position of the POI in the electronic 3D viewing environment comprises: iteratively performing the estimation process steps comprising: estimating a 3D spatial depth of each of the POI pixels in the snapshot; estimating a 2D projection coordinate of each of the POI pixels in one of the recorded motions using a 3D spatial coordinate of the POI pixel in the snapshot computed from the 2D projection coordinate and the estimated 3D spatial depth of the POI pixel in the snapshot, the estimated distance between the optical sensor to the POI center, and the moving trajectory from the recorded motion to the snapshot; determining an estimation error, being a mean of differences between the image intensities of all pixels at the estimated 2D projection coordinates of the POI pixels in one or more recorded motions and an image intensity of all POI pixels in the snapshot; and continuing the iteration of above estimation process steps until an estimation error smaller than an estimation error threshold is found, or a maximum number of iterations is performed; wherein the estimated 3D position of the POI in the electronic 3D viewing environment being represented by the estimated 3D spatial coordinates of the POI pixels computed in the estimation iteration having an estimation error smaller than an estimation error threshold or the estimation iteration having the smallest estimation error.

In another embodiment, the POI indicator comprises: 2D projection coordinates of the POI pixels within a perimeter encircling/marking the POI on a POI indicator 3D spatial plane defined by a POI indicator horizontal/vertical/inclined plane template, wherein the perimeter defines the 2D projection coordinates of POI pixels within; and an intersection angle between a normal of the POI indicator 3D spatial plane and a y-axis (x-axis or any other reference-axis that serves as a reference direction; but only y-axis is referred to throughout this document to simplify the illustration of the concept of the present invention) in the snapshot; and wherein each iteration of the estimation of each 3D spatial depth of each of the POI pixels in the snapshot using: the 2D projection coordinates of the POI pixels, the intersection angle between the normal of the POI indicator 3D spatial plane and the y-axis in the snapshot, an estimation of distance between the optical sensor to the POI center, and an estimated rotation angle along the normal vector axis cross a vector from the optical sensor center to the POI center.

BRIEF DESCRIPTION OF THE DRAWINGS

Embodiments of the invention are described in more detail hereinafter with reference to the drawings, in which.

DETAILED DESCRIPTION

In the following description, apparatuses and methods of allowing POIs to be defined and tracking the POIs in electronic 3D viewing environments, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
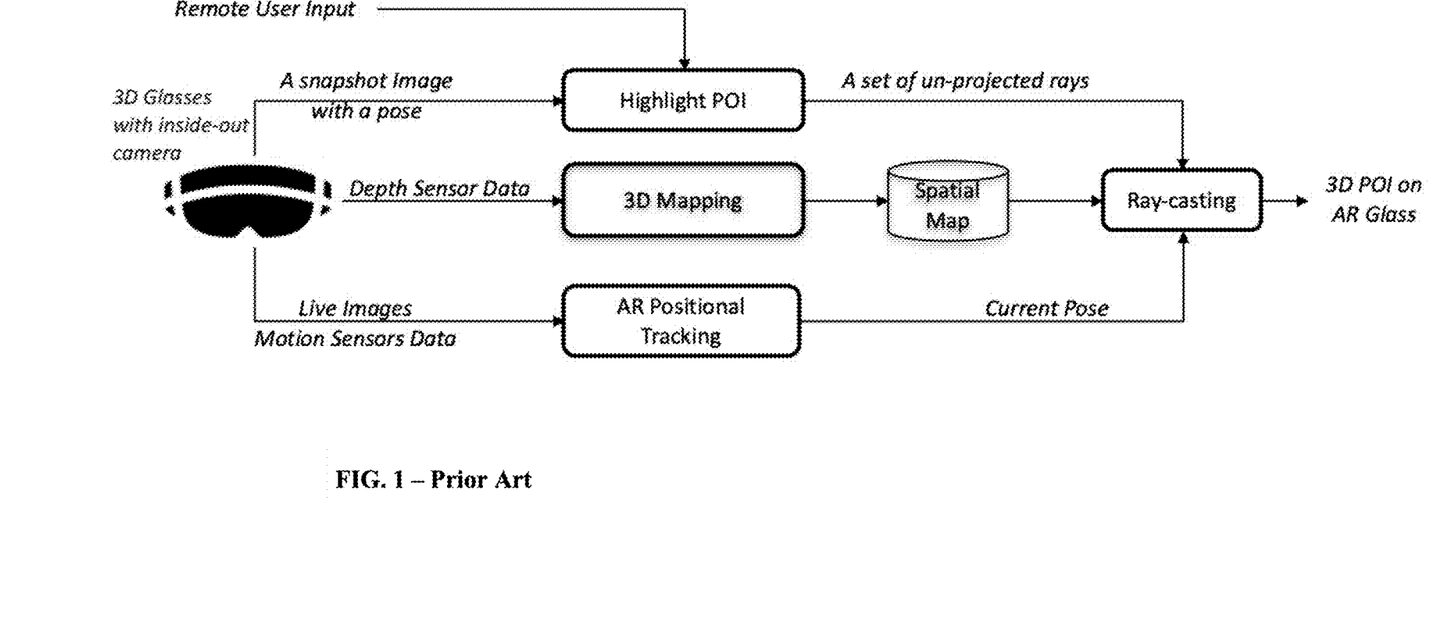
FIG. 1 depicts a schematic diagram illustrating a conventional method of tracking a POI in an electronic 3D viewing environment.

Referring to FIG. 1. In an instance of onsite field servicing, the onsite user (i.e. field technician) is wearing a pair of AR glasses in communication with a separate AR console being viewed and controlled by a remote user (i.e. backend engineer). Under the conventional method, as a local processor (i.e. the built-in processor of the AR glasses) is capturing live images of the onsite user's surrounding via an optical sensor (i.e. the built-in inside-out camera of the AR glasses), a snapshot image with a pose is sent to the AR console. While the live images are being captured, depth sensor data and motion sensor data are also being collected by the local processor. Through the AR console, the remote user defines a POI in the snapshot image, which is displayed in 2D. The POI definition data (i.e. in a set of un-projected rays—image pixel 2D projection coordinate data and/or line equations representing rays passing through the optical center of the optical sensor as the image being captured) is sent back to the local processor for rendering. With the depth sensor data, the local processor performs a 3D mapping operation to create a spatial map; with the motion sensor data and the live images, the local processor tracks the onsite user's position; and together with the spatial map and the POI definition data, the local processor renders and superimposes (i.e. by a ray-casting operation) the POI indicator into the current pose of the 3D viewing environment perceived by the onsite user through her AR glasses. As such, the conventional method requires at least a depth sensor, which is expensive. The 3D mapping operation is also computational and data intensive yet low in accuracy.

Figure 2:
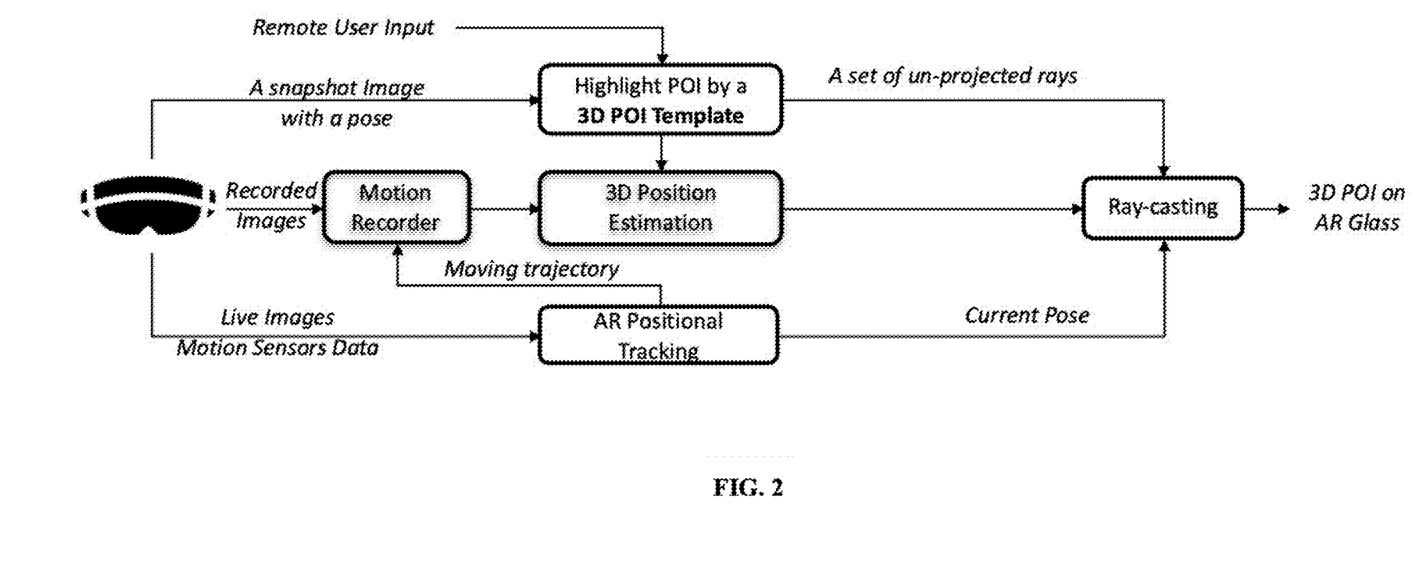
FIG. 2 depicts a schematic diagram illustrating a method for tracking a POI in an electronic 3D viewing environment in accordance to various embodiments of the present invention.

Referring to FIG. 2. In accordance to various embodiments of the present invention, the method differs from the conventional method in that the local processor does not require any depth sensor data. Instead, the captured surrounding images are recorded, and with the collected motion sensor data, a moving trajectory of the onsite user is estimated and also recorded. The local processor then takes as input the recorded images, the recorded moving trajectory estimation, and the definition of the POI to estimate the 3D position of the POI in the current pose of the 3D viewing environment. In addition, if the definition of the POI is created using a pre-defined POI indicator template, then the computation of the 3D position of the POI in the current pose can speed up significantly as the 3D coordinates of a majority of the pixels of the POI can be estimated by mathematical equation computations.

Figure 3:
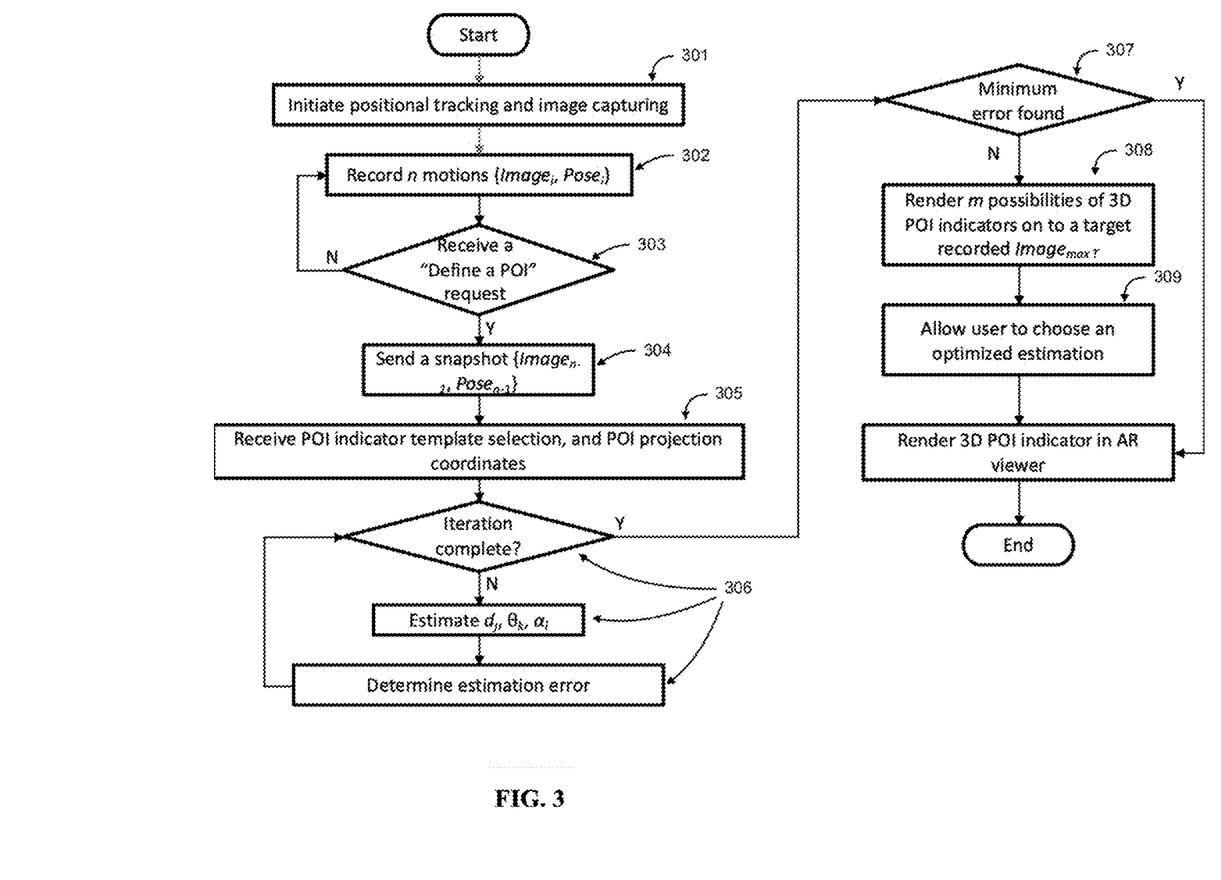
FIG. 3 depicts a flow chart illustrating the process steps of the method of tracking a POI in an electronic 3D viewing environment in accordance to various embodiments of the present invention.

Referring to FIG. 3. In accordance to one embodiment of the present invention, provided is a method of tracking a POI in an electronic 3D viewing environment, comprising:

(301) initiating a local processor to command an optical sensor being used by an onsite user to start capturing images of the onsite user's surrounding and a motion sensor to start collecting motion sensor data for tracking the onsite user's position;

(302) the local processor capturing and recording n number of motions of the onsite user, each motion comprises a surrounding image, $Image_i$, and a pose, $Pose_i$;

(303) the local processor receiving a request for defining a POI from a remote display and user interface device;

(304) the local processor sending to the remote display and user interface device a snapshot ($Image_{n-1}$ and $Pose_{n-1}$);

(305) the remote display and user interface device receiving a POI definition of a POI in the snapshot, wherein the POI definition comprises one or more POI 2D projection coordinates in the snapshot and a selection of POI indicator template; then forwarding the POI definition to the local processor;

(306) the local processor estimating, using the received POI definition and the recorded motions, the 3D position of the POI (3D spatial coordinates of the pixels of the POI) in the 3D viewing environment as viewed through an AR viewing device by the onsite user; wherein the determination comprising: iteratively estimating a 3D spatial depth, Z, of each of the POI pixels, p, based on the selected POI indicator template; and determining an estimation error in each iteration of depth estimations;

(307) if a minimum estimation error (the smallest estimation error that is also smaller than a minimum estimation error threshold, or simply the smallest estimation error if one cannot be found smaller than the minimum estimation error threshold after the maximum number of iterations is performed) is found, then the depth estimations of the corresponding iteration, the POI definition, and the selected POI indicator template are used by the local processor to render and superimpose a POI indicator in a current 3D viewing environment perceived by the onsite user through the AR viewing device;

(308) else after the maximum number of iterations is reached, selecting m number of lowest estimation errors and using the depth estimations of the corresponding iterations for rendering and superimposing the m number of corresponding POI indicators into a 3D viewing environment rendered using one of the recorded images (Image$_{maxT}$) that is most dissimilar to the snapshot image; and (309) allowing a user to select one of them number of POI indicators as an optimized POI indicator for rendering and superimposing on to the current 3D viewing environment perceived by the onsite user through the AR viewing device.

Figure 4:
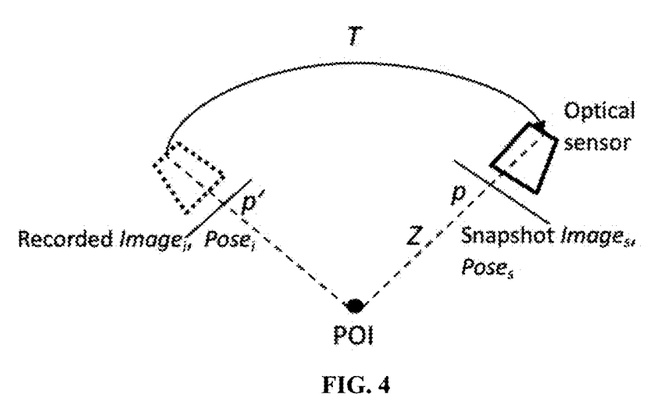
FIG. 4 illustrates the computation of a depth estimation of a snapshot image pixel in the method of tracking a POI in an electronic 3D viewing environment in accordance to one embodiment of the present invention.

To better illustrate the estimation of the 3D spatial depth, Z, of a POI pixel from its 2D projection coordinate, FIG. 4 is referred. The 3D spatial depth of a pixel in a snapshot image can be estimated by:

$$p' = \pi(T^{-1}\pi^{-1}(p, Z(p)));$$

$$\delta_i = \sum_{pixel[0]}^{pixel[n-1]} (I_i(p') - I_s(p)); \text{ and}$$

$$\bar{\delta} = \frac{\sum_{i=0}^{j-1} \delta_i}{j};$$

where p is a POI pixel's coordinates in the snapshot image, Image$_s$;
p' is the estimated coordinates of the POI pixel in recorded image i, Image$_i$;
Z(p) is the depth estimation of the POI pixel in Image$_s$;
$\pi^{-1}$ is an inverse projection function;
T is the function of moving trajectory from Pose$_i$ to Pose$_s$;
I$_s$(p) is the image intensity of pixel at coordinate p in Image$_s$;
I$_i$(p') is the image intensity of pixel at coordinate p' in Image$_i$; and
$\delta_i$ is the photometric error of a set of POI pixels [0 . . . n–1] between Image$_i$ and Image$_s$; and
$\bar{\delta}$ is the estimation error.

The Z(p) function (Z(p) for all POI pixels) is computed iteratively until a minimum $\bar{\delta}$, that is the minimum estimation, is found, and it is computational intensive.

In this embodiment, the estimation error is determined based on the difference mean of differences between the image intensity intensities of all pixels at the estimated 2D projection coordinates of the POI pixels in one or more recorded motion motions and an image intensity of all POI pixels in the snapshot. An ordinarily skilled person in the art can easily adopt other techniques to determine the estimation error without undue experimentation or deviation from the spirit of the present invention. These techniques include, without limitation, using a function (i.e. inverse) of image matching quality of all pixels at the estimated 2D projection coordinates of the POI pixels in the recorded motion(s) and all POI pixels in the snapshot, the function of image matching quality indicating a degree of mismatch between images.

Figure 5A:
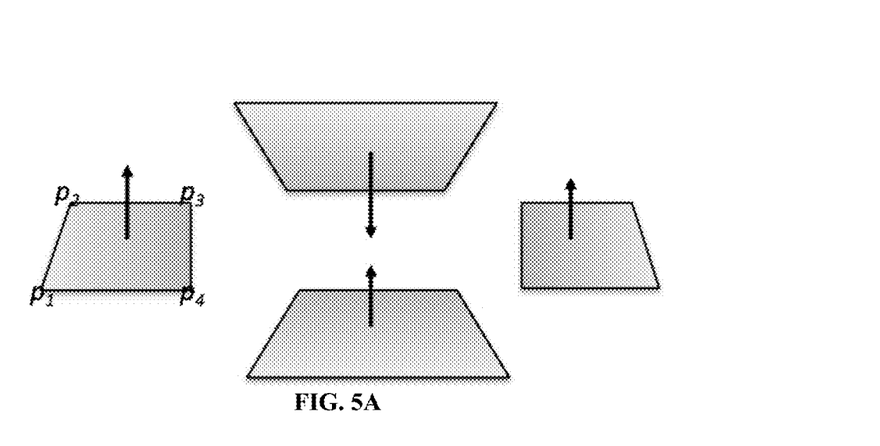
FIG. 5A illustrates the use of a POI indicator horizontal plane template in a depth estimation of snapshot image POI pixels in the method of tracking a POI in an electronic 3D viewing environment in accordance to one embodiment of the present invention.
Figure 5B:
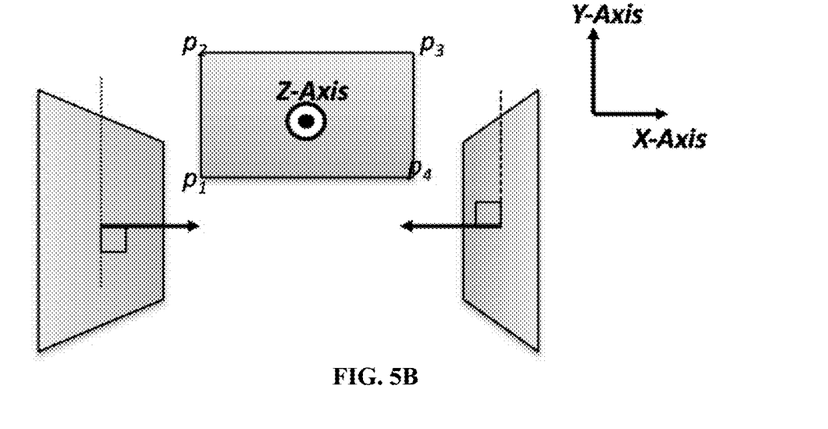
FIG. 5B illustrates the use of a POI indicator vertical plane template in a depth estimation of snapshot image POI pixels in the method of tracking a POI in an electronic 3D viewing environment in accordance to one embodiment of the present invention.
Figure 5C:
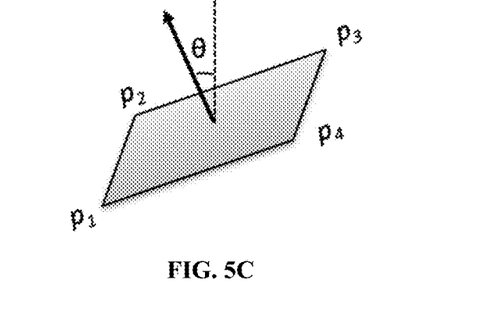
FIG. 5C illustrates the use of a POI indicator inclined plane template in a depth estimation of snapshot image POI pixels in the method of tracking a POI in an electronic 3D viewing environment in accordance to one embodiment of the present invention.

It is computational intensive to estimate the 3D spatial depths of all pixels in a POI, that is the Z(p) function. To reduce the computational resource requirements needed, POI indictor templates are used in defining a POI in the snapshot image. Referring to FIGS. 5A-5C. If a POI appears along the horizontal plane in a snapshot image, such as a horizontal surface or an object resting on a horizontal surface (i.e. a floor), a user may select the POI indictor horizontal plane template then define a perimeter (i.e. a quadrilateral) encircling/marking the POI along the horizon plane in the snapshot image (i.e. draw the quadrilateral box around a POI on a touch display screen of the AR console displaying the snapshot image) as shown in FIG. 5A. The four corners of the user-defined quadrilateral box provide four POI corner pixels' 2D projection coordinates ($p_1(x_1, y_1)$, $p_2(x_2, y_2)$, $p_3(x_3, y_3)$, $p_4(x_4, y_4)$). A normal of the horizon plane quadrilateral box is obtained, that is either pointing upward or downward depending on whether the POI appears facing up or down. Consequently, an intersection angle between the normal and the 2D spatial y-axis (x-axis or any other reference-axis that serves as a reference direction; but only y-axis is referred to throughout the description of the embodiments of the present invention to simplify the illustration of the concept of the present invention) is also obtained, that is for an upward-pointing normal, the intersection angle is 0°; and 180° for a downward-pointing normal. For a POI that appears sideway or situating on a vertical surface, the POI indictor vertical plane template can be selected. Similarly, the user defines a perimeter encircling/marking the POI along the vertical plane in the snapshot image (i.e. draw a quadrilateral around the POI on the touch display screen of the AR console displaying the snapshot image) as shown in FIG. 5B. Again, the four corners provide four POI corner pixels' 2D projection coordinates ($p_1(x_1, y_1)$, $p_2(x_2, y_2)$, $p_3(x_3, y_3)$, $p_4(x_4, y_4)$); a normal of the vertical plane quadrilateral box is obtained, that is pointing toward the optical sensor, rightward or leftward depending on whether the POI appears facing the optical sensor, right side or left side; and an intersection angle between the normal and the 2D spatial y-axis is also obtained if the POI does not appears facing the optical sensor, that is for a rightward-pointing normal, the intersection angle is 270° and 90° for a leftward-pointing normal. Extending the concept of the POI indictor horizontal and vertical plane templates, a POI indictor inclined plane template, as shown in FIG. 5C, can be used for a POI lying on any 2D spatial plane having a normal pointing to one of all possible 2D spatial directions with an arbitrary intersection angle, θ. Thus, the intersection angle can be regarded as the yaw of the 2D spatial plane of the POI as defined using one of the POI indicator plane templates. In addition, an estimated distance, d, between the optical sensor center and the POI indictor center is obtained, which can be specified by the user (i.e. 0.2~2 meters for a POI that is near, 2~10 meters for POI that is far).

Figure 6:
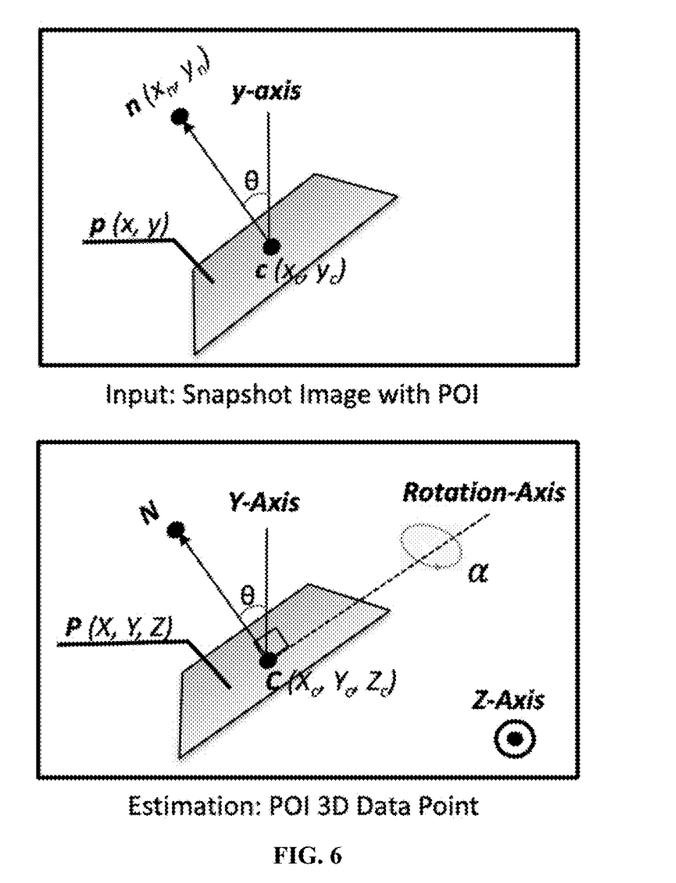
FIG. 6 further illustrates the use of POI indicator templates in a depth estimation of snapshot image POI pixels in the method of tracking a POI in an electronic 3D viewing environment in accordance to one embodiment of the present invention.

With the four POI corner pixels' 2D projection coordinates ($p_1(x_1, y_1)$, $p_2(x_2, y_2)$, $p_3(x_3, y_3)$, $p_4(x_4, y_4)$), the intersection angle, θ, between the normal and the 2D spatial y-axis, and the estimated distance, d, between the optical sensor center and the POI indictor center, further computation is made to obtain the Z(p) function. Referring to FIG. 6. In the 2D spatial plane, a center coordinate, $c(x_c, y_c)$, of the POI can be found from $p_1(x_1, y_1)$, $p_2(x_2, y_2)$, $p_3(x_3, y_3)$, and $p_4(x_4, y_4)$. The normal vector can be defined as $\vec{nc}$, and the intersection angle between $\vec{nc}$ and the 2D spatial y-axis is:

$$\theta = \tan^{-1}\left(\frac{x_n - x_c}{y_n - y_c}\right).$$

That is, when un-projecting to 3D space, the intersection angle between the direction vector, $\widehat{NC}$, and the 3D spatial Y-axis is also equal to $\theta$. With the estimated distance, $d$, between the optical sensor center and the POI indictor center, $\vec{C}(X_C, Y_C, Z_C)$ can be obtained by solving:

$$d^2 = X_C^2 + Y_C^2 + Z_C^2; \text{ and}$$
$$X_C = Z_C \frac{x_n}{f_X}; \text{ and}$$
$$Y_C = Z_C \frac{y_n}{f_y};$$

where $(f_x, f_y)$ are the focal lengths of the optical sensor. Then by solving:

$$\widehat{NC} = \sin\theta\hat{i} + \cos\theta\hat{j}; \text{ and}$$

$$\widehat{NC} \cdot (\vec{PC}) = 0;$$

$\vec{PC}$, which is the vector from a POI pixel at point P to the POI center C (or any one reference point within the POI), is computed. And from $\vec{PC}$, compute $\vec{P_r}$, which is a new vector of $\vec{PC}$ after rotating point P about the rotation-axis ($\widehat{NC} \times C$) of the 3D spatial plane of the POI indicator, by:

$$\text{Quaternion}\left[0, \vec{P_r}\right] = qrq^{-1};$$
$$q = \left[\cos\frac{\alpha}{2}, (\widehat{NC} \times \vec{C})\sin\frac{\alpha}{2}\right]; \text{ and}$$
$$r = \left[0, \vec{PC}\right];$$

where $\alpha$ is the rotation angle along the axis of the normal vector cross the vector from the optical sensor center to the POI center.

Finally, $Z(p)$ can be estimated by:

$$Z(p) = \text{Raycasting}(\vec{0,p} - \vec{0,P_r});$$

where 0 is the optical center of the optical sensor, and $\vec{p-0}$ is un-projected ray of the POI pixels' 2D projection coordinates p, and $\vec{P_r}$ is the collider.

Although the above-described embodiments utilize a quadrilateral perimeter as the POI indicator encircling/marking a POI, an ordinarily skilled person in the art can appreciate that any other perimeter shape, such as a circle, oval, and polygon, as the POI indicator can be readily adopted without undue experimentations or deviation from the spirit of the present invention.

Figure 7:
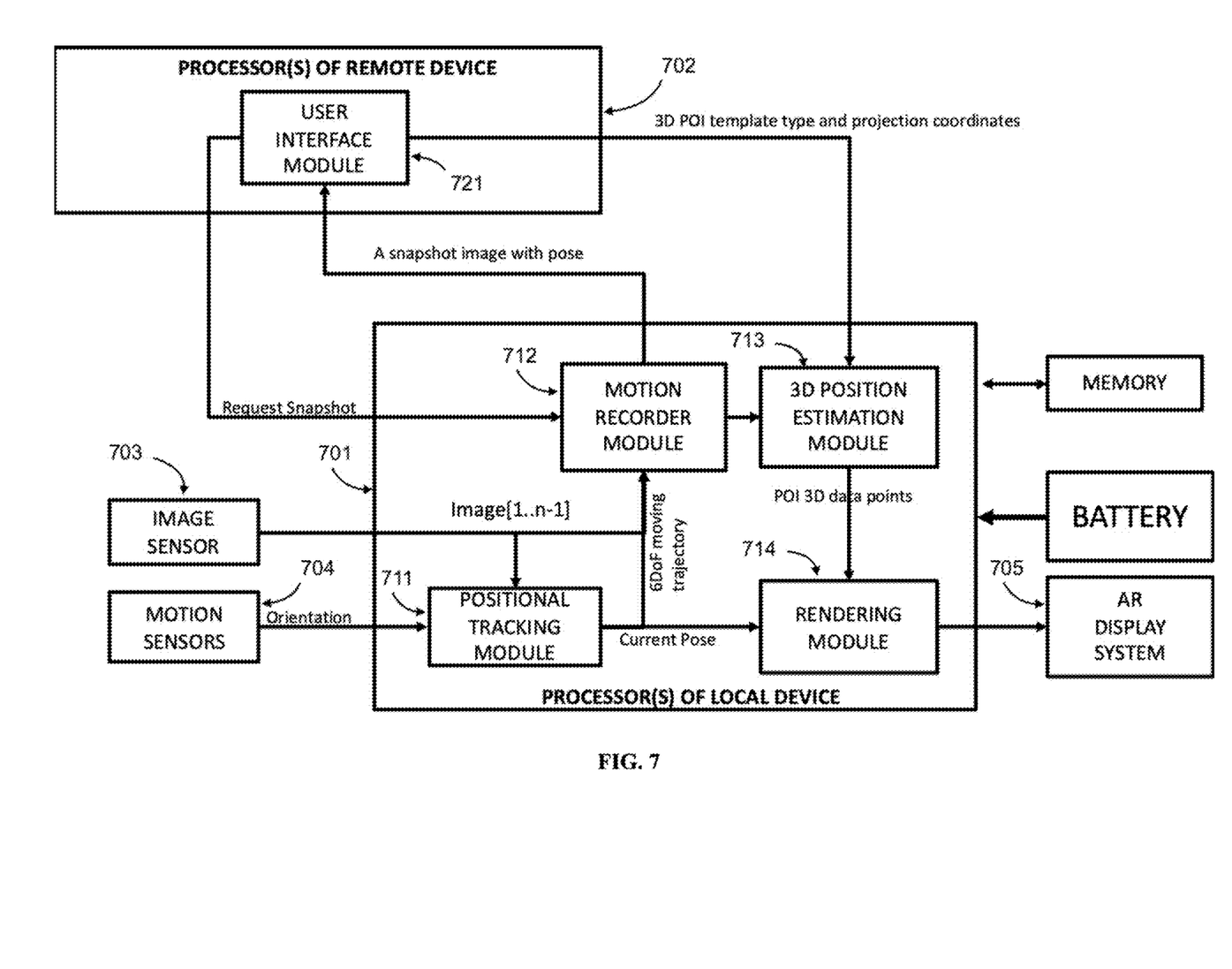
FIG. 7 depicts of schematic diagram of an apparatus for tracking a POI in an electronic 3D viewing environment in accordance to various embodiments of the present invention.

Referring to FIG. 7. In accordance to various embodiments of the present invention, provided is an apparatus for tracking a POI in an electronic 3D viewing environment. The apparatus comprises: a local processor 701 (i.e. in an AR viewing device used by an onsite user); a remote processor 702 (i.e. in a remotely located AR console used by a remote user); an optical sensor 703 in communication with the local processor 701 for capturing surrounding images of the remote user; one or more motion sensors 704 in communication with the local processor 701 for capturing the positions and orientations of the remote user; and an AR display 705 (i.e. a 3D display of the AR viewing device for displaying a 3D viewing environment to an onsite user). The local processor 701 comprises: a positional tracking module 711 for processing the motion sensor signal data from the motion sensors 704 and the images from the optical sensor 703, generating data of the onsite user's poses and positions in the surrounding and moving trajectory, and providing live images and current poses; a motion recorder module 712 for recording the images from the optical sensor 703 and the user's moving trajectory data from the positional tracking module 711, providing snapshot images (retrieved from the image recorded) in responses to requests from the remote processor 702, and providing recorded images and recorded moving trajectory data; a 3D position estimation module 713 for processing POI definition data received from the remote processor 702, recorded images and recorded moving trajectory data from the motion recorder module 712, estimating the 3D position of the POI (3D spatial coordinates of the pixels of the POI); a rendering module 714 for processing the estimated 3D position of the POI from the 3D position estimation module 713, taking the live images and current poses from the positional tracking module 711, and rendering and superimposing a POI indicator on to a 3D viewing environment for display by the AR display 705. The remote processor 702 comprises a user interface module 721 for providing selections of POI indictor templates and receiving the remote user's POI definition (POI corner pixels' 2D projection coordinates) and selection of POI indictor template.

An ordinarily skilled person in the art can appreciate that various other embodiments comprising different number of local and/or remote processors for executing and performing different aforesaid functions, various other embodiments in where the local processor and the remote processing being the same processor, and yet other embodiments in where the onsite user and the remote user being the same person are readily realizable without undue experiments or deviation from the spirit of the present invention.

The embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuitry configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of tracking a point of interest (POI) in an electronic three-dimensional (3D) viewing environment, comprising:
   capturing and recording, by a local processor electrically connected to an optical sensor and a motion sensor, a plurality of motions of a first user, wherein each of the motions comprises an image surrounding and a pose of the first user;
   displaying, by a remote processor via a remote user interface, a snapshot to a second user, wherein the snapshot is one of the recorded motions;
   receiving, by the remote processor, a POI indicator encircling or marking a POI in the snapshot from the second user;
   sending, by the remote processor, POI indicator data to the local processor;
   estimating, by the local processor, a 3D position of the POI in the electronic 3D viewing environment, using the POI indicator, a moving trajectory from each of the recorded motions to the snapshot, and an estimation of distance between the optical sensor to the POI center; and
   rendering and superimposing, by the local processor, the POI indicator in the electronic 3D viewing environment to be displayed to the first user using the estimated 3D position of the POI, the moving trajectory, and the recorded motions;
   wherein the estimation of a 3D position of the POI in the electronic 3D viewing environment comprises:
      iteratively performing the estimation process steps comprising:
         estimating a 3D spatial depth of each of the POI pixels in the snapshot;
         computing a 3D spatial coordinate of each of the POI pixels in the snapshot using a 2D projection coordinate of the POI pixel in the snapshot and the estimated 3D spatial depth of the POI pixel in the snapshot;
         estimating a 2D projection coordinate of each of the POI pixels in one of the recorded motions using the 3D spatial coordinate of the POI pixel in the snapshot, and the moving trajectory from the recorded motion to the snapshot;
         computing a 3D spatial coordinate of each of the POI pixels in the recorded motion from the estimated 2D projection coordinate of the POI pixel in the recorded motion; and
         determining an estimation error; and
      continuing the iteration of above estimation process steps until an estimation error smaller than an estimation error threshold is found, or a maximum number of iterations is performed;
   wherein the estimated 3D position of the POI in the electronic 3D viewing environment is represented by the 3D spatial coordinates of the POI pixels computed in the estimation iteration having an estimation error smaller than an estimation error threshold or the estimation iteration having the smallest estimation error;
   wherein the POI indicator comprises:
      2D projection coordinates of the POI pixels within a perimeter encircling/marking the POI on a POI indicator 3D spatial plane defined by a POI indicator plane template, wherein the perimeter defines the 2D projection coordinates of POI pixels within; and
      an intersection angle between a normal of the POI indicator 3D spatial plane and a reference axis in the snapshot; and
   wherein each iteration of the estimation of a 3D spatial depth of each of the POI pixels in the snapshot uses:
      the 2D projection coordinates of the POI pixels in the snapshot,
      the intersection angle between the normal of the POI indicator 3D spatial plane and the reference axis in the snapshot,
      an estimation of distance between the optical sensor to the POI center, and
      an estimated rotation angle along the normal vector axis crosses a vector from the optical sensor center to the POI center.

2. The method of claim 1,
   wherein the POI indicator plane is a POI indicator horizontal plane template;
   wherein the intersection angle between the normal of the 3D spatial plane and the reference axis is 0° for an upward-facing POI or 180° for a downward-facing POI; and
   wherein the reference axis is y-axis.

3. The method of claim 1,
   wherein the POI indicator plane is a POI indicator vertical plane template;
   wherein the normal is pointing toward the optical sensor or the intersection angle between the normal of the 3D spatial plane and the reference axis is 270° for a rightward-facing POI, 90° for a leftward-facing POI; and
   wherein the reference axis is y-axis.

4. The method of claim 1,
   wherein the POI indicator plane is a POI indicator inclined plane template having a normal pointing to one of all possible 2D spatial directions;
   wherein the intersection angle between the normal of the 3D spatial plane and the reference axis is between 0° and 360°, and
   wherein the reference axis is y-axis.

5. The method of claim 1, wherein the perimeter encircling/marking the POI is a quadrilateral.

6. The method of claim 1, wherein the estimation of a 3D position of the POI in the electronic 3D viewing environment further comprises:

selecting a number of estimation iterations performed that have lowest estimation errors;

for each of the selected estimation iteration, using the 3D spatial coordinates of the POI pixels computed in the selected estimation iteration as the estimated 3D position of the POI and one of the recorded motions that is most dissimilar to the snapshot for rendering and superimposing the POI indicator in a POI selection electronic 3D viewing environment;

receiving a user selection of which one of the POI indicators in the POI selection electronic 3D viewing environment; and using the 3D spatial coordinates of the POI pixels corresponding to the selected POI indicator as the estimated 3D position for rendering and superimposing the POI indicator in the electronic 3D viewing environment to be displayed to the first user.

7. The method of claim 1, wherein the estimation error being a mean of differences between image intensities of all pixels at the estimated 2D projection coordinates of the POI pixels in one or more of the recorded motions and an image intensity of all POI pixels in the snapshot.

8. The method of claim 1, wherein the estimation error being a function of image matching quality of all pixels at the estimated 2D projection coordinates of the POI pixels in one or more of the recorded motions and all POI pixels in the snapshot, the function of image matching quality indicating a degree of mismatch between images.

9. An apparatus for tracking a point of interest (POI) in an electronic three-dimensional (3D) viewing environment, comprising:

a local processor electrically connected to an optical sensor and a motion sensor, the local processor configured to:
capture and record a plurality of motions of a first user, wherein each of the motions comprises an image surrounding and a pose of the first user; and a remote processor configured to:
display via a remote user interface, a snapshot to a second user, wherein the snapshot is one of the recorded motions;
receive a POI indicator encircling or marking a POI in the snapshot from the second user;
send POI indicator data to the local processor;

wherein the local processor is further configured to estimate a 3D position of the POI in the electronic 3D viewing environment, using the POI indicator data, a moving trajectory from each of the recorded motions to the snapshot, and an estimation of distance between the optical sensor to the POI center;

wherein the local processor is further configured to render and superimpose the POI indicator in the electronic 3D viewing environment to be displayed to the first user using the estimated 3D position of the POI, the moving trajectory, and the recorded motions;

wherein the estimation of a 3D position of the POI in the electronic 3D viewing environment comprises:
iteratively performing the estimation process steps comprising:
estimating a 3D spatial depth of each of the POI pixels in the snapshot;
computing a 3D spatial coordinate of each of the POI pixels in the snapshot using a 2D projection coordinate of the POI pixel in the snapshot and the estimated 3D spatial depth of the POI pixel in the snapshot;

estimating a 2D projection coordinate of each of the POI pixels in one of the recorded motions using the 3D spatial coordinate of the POI pixel in the snapshot, and the moving trajectory from the recorded motion to the snapshot;
computing a 3D spatial coordinate of each of the POI pixels in the recorded motion from the estimated 2D projection coordinate of the POI pixel in the recorded motion; and
determining an estimation error; and
continuing the iteration of above estimation process steps until an estimation error smaller than an estimation error threshold is found, or a maximum number of iterations is performed;

wherein the estimated 3D position of the POI in the electronic 3D viewing environment is represented by the 3D spatial coordinates of the POI pixels computed in the estimation iteration having an estimation error smaller than an estimation error threshold or the estimation iteration having the smallest estimation error;

wherein the POI indicator comprises:
2D projection coordinates of the POI pixels within a perimeter encircling/marking the POI on a POI indicator 3D spatial plane defined by a POI indicator plane template, wherein the perimeter defines the 2D projection coordinates of POI pixels within; and
an intersection angle between a normal of the POI indicator 3D spatial plane and a reference axis in the snapshot; and wherein each iteration of the estimation of a 3D spatial depth of each of the POI pixels in the snapshot uses:
the 2D projection coordinates of the POI pixels in the snapshot,
the intersection angle between the normal of the POI indicator 3D spatial plane and the reference axis in the snapshot,
an estimation of distance between the optical sensor to the POI center, and
an estimated rotation angle along the normal vector axis crosses a vector from the optical sensor center to the POI center.

10. The apparatus of claim 9,
wherein the POI indicator plane is a POI indicator horizontal plane template;
wherein the intersection angle between the normal of the 3D spatial plane and the reference axis is 0° for an upward-facing POI or 180° for a downward-facing POI; and
wherein the reference axis is y-axis.

11. The apparatus of claim 9,
wherein the POI indicator plane is a POI indicator vertical plane template;
wherein the normal is pointing toward the optical sensor or the intersection angle between the normal of the 3D spatial plane and the reference axis is 270° for a rightward-facing POI, 90° for a leftward-facing POI; and
wherein the reference axis is y-axis.

12. The apparatus of claim 9,
wherein the POI indicator plane is a POI indicator inclined plane template having a normal pointing to one of all possible 2D spatial directions;
wherein the intersection angle between the normal of the 3D spatial plane and the reference axis is between 0° and 360°, and
wherein the reference axis is y-axis.

13. The apparatus of claim 9, wherein the perimeter encircling/marking the POI is a quadrilateral.

14. The apparatus of claim 9, wherein the estimation of a 3D position of the POI in the electronic 3D viewing environment further comprises:

selecting a number of estimation iterations performed that have lowest estimation errors;

for each of the selected estimation iteration, using the 3D spatial coordinates of the POI pixels computed in the selected estimation iteration as the estimated 3D position of the POI and one of the recorded motions that is most dissimilar to the snapshot for rendering and superimposing the POI indicator in a POI selection electronic 3D viewing environment;

receiving a user selection of which one of the POI indicators in the POI selection electronic 3D viewing environment; and using the 3D spatial coordinates of the POI pixels corresponding to the selected POI indicator as the estimated 3D position for rendering and superimposing the POI indicator in the electronic 3D viewing environment to be displayed to the first user.

15. The apparatus of claim 9, wherein the estimation error being a mean of differences between image intensities of all pixels at the estimated 2D projection coordinates of the POI pixels in one or more of the recorded motions and an image intensity of all POI pixels in the snapshot.

16. The apparatus of claim 9, wherein the estimation error being a function of image matching quality of all pixels at the estimated 2D projection coordinates of the POI pixels in one or more of the recorded motions and all POI pixels in the snapshot, the function of image matching quality indicating a degree of mismatch between images.

* * * * *